(12) United States Patent
Sarkar et al.

(10) Patent No.: US 9,710,890 B2
(45) Date of Patent: Jul. 18, 2017

(54) JOINT ENHANCEMENT OF LIGHTNESS, COLOR AND CONTRAST OF IMAGES AND VIDEO

(71) Applicant: Intel Corporation, Santa Clara, CA (US)

(72) Inventors: Abhijit Sarkar, Rochester, NY (US); Jorge E. Caviedes, Mesa, AZ (US); Mahesh Subedar, Laveen, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/704,116

(22) Filed: May 5, 2015

(65) Prior Publication Data

US 2015/0235348 A1    Aug. 20, 2015

Related U.S. Application Data

(63) Continuation of application No. 13/923,451, filed on Jun. 21, 2013, now Pat. No. 9,053,523, which is a
(Continued)

(51) Int. Cl.
*H04N 5/57* (2006.01)
*G06T 5/00* (2006.01)
*H04N 1/60* (2006.01)

(52) U.S. Cl.
CPC ............... *G06T 5/00* (2013.01); *G06T 5/007* (2013.01); *H04N 1/6005* (2013.01); *H04N 1/6027* (2013.01); *G06T 2207/10024* (2013.01)

(58) Field of Classification Search
USPC ........ 348/588, 473, 649–651, 673, 687–688, 348/645, 603, 655, 678
See application file for complete search history.

(56) References Cited

U.S. PATENT DOCUMENTS 6,219,129 B1   4/2001   Kinjo et al.
6,476,877 B2   11/2002  Kihara et al.
(Continued)

FOREIGN PATENT DOCUMENTS

CN    1545327 A    11/2004
CN    101217674 A   7/2008
(Continued)

OTHER PUBLICATIONS

Ebner, F., et al., "Development and Testing of a Color Space (IPT) with Improved Hue Uniformity," The Sixth Color Imaging Conference: Color Science, Systems and Applications, IST, 1998 pp. 8-13.
(Continued)

*Primary Examiner* — Paulos M Natnael
(74) *Attorney, Agent, or Firm* — Trop Pruner & Hu, P.C.

(57) ABSTRACT

In some embodiments, color and contrast enhancement video processing may be done in one shot instead of adjusting one of color and contrast enhancement, then the other, and then going back to the first one to readjust because of the second adjustment. In some embodiments, global lightness adjustment, local contrast enhancement, and saturation enhancement may be done at the same time and in parallel. Lightness adjustment improves visibility of details for generally dark or generally light images without changing intended lighting conditions in the original shot, and is used to enhance the range of color/saturation enhancement. Local contrast enhancement done in parallel improves visual definition of objects and textures and thus local contrast and perceived sharpness.

21 Claims, 4 Drawing Sheets

Related U.S. Application Data continuation of application No. 12/286,317, filed on Sep. 30, 2008, now Pat. No. 8,477,247.

(56) References Cited

U.S. PATENT DOCUMENTS

| | | | |
|---|---|---|---|
| 6,661,905 | B1 | 12/2003 | Chupp et al. |
| 6,992,726 | B2* | 1/2006 | Chupp ............... H04N 7/08 348/473 |
| 7,013,025 | B2 | 3/2006 | Hiramatsu |
| 7,043,385 | B2 | 5/2006 | Stokes |
| 7,190,828 | B2 | 3/2007 | Jacob |
| 7,292,375 | B2 | 11/2007 | Nishida |
| 7,428,333 | B2 | 9/2008 | Asari et al. |
| 7,548,264 | B2 | 6/2009 | Mitsunaga et al. |
| 7,567,294 | B2 | 7/2009 | Lu et al. |
| 7,593,066 | B2 | 9/2009 | Zhu |
| 7,602,988 | B2 | 10/2009 | Li |
| 7,639,263 | B2 | 12/2009 | Karlov et al. |
| 7,813,003 | B2* | 10/2010 | Lin ............... H04N 1/6008 345/600 |
| 7,916,152 | B2 | 3/2011 | Jones et al. |
| 7,990,393 | B2 | 8/2011 | Higgins |
| 8,036,456 | B2* | 10/2011 | Stellbrink ............ G06T 5/005 382/167 |
| 8,055,070 | B2* | 11/2011 | Bassi ............... G09G 3/2003 382/167 |
| 8,098,932 | B2 | 1/2012 | Wu et al. |
| 8,155,441 | B2 | 4/2012 | Sawada et al. |
| 8,174,623 | B2 | 5/2012 | Chen et al. |
| 8,236,876 | B2 | 8/2012 | Ahmed et al. |
| 8,547,394 | B2 | 10/2013 | Swic et al. |
| 8,565,522 | B2 | 10/2013 | Swic |
| 8,675,010 | B2 | 3/2014 | Cho et al. |
| 9,219,898 | B2* | 12/2015 | Doser ............... G09G 5/02 |
| 2007/0086650 | A1 | 4/2007 | Li |
| 2007/0115270 | A1 | 5/2007 | Rai |
| 2008/0062484 | A1 | 3/2008 | Moriya |
| 2008/0150958 | A1* | 6/2008 | Higgins ............ G09G 3/2003 345/591 |
| 2009/0002561 | A1 | 1/2009 | Barnhoefer |
| 2009/0105544 | A1 | 4/2009 | Takahira |
| 2012/0083411 | A1* | 4/2012 | Ahmed ............... A61L 15/56 502/402 |

FOREIGN PATENT DOCUMENTS

| | | |
|---|---|---|
| CN | ZL201310128892.9 | 6/2016 |
| EP | 2169943 | 3/2010 |
| EP | 2169943 A2 | 3/2010 |
| WO | 2006100127 | 9/2006 |
| WO | 2006100127 A2 | 9/2006 |

OTHER PUBLICATIONS

Taplin, Lawrence A., et al., "When Good Hues Go Bad," CGIV 2004—Second European Conference on Color in Graphics, Imaging and Vision (2004) 348-352.

Chinese Patent Office issued 3rd office action in corresponding divisional CN application No. 201310128892.9 dated Feb. 4, 2016 (5 pages).

CN Patent Office office action in corresponding CN application No. 201310128892.9 dated Oct. 29, 2014 (11 pages).

CN Patent Office office action in corresponding CN application No. 201310128892.9 dated Jul. 14, 2015 (16 pages).

CN Patent Office office action in corresponding CN application No. 200910222699.5 dated May 11, 2011 (7 pages).

CN Patent Office office action in corresponding CN application No. 200910222699.5 dated May 4, 2012 (8 pages).

CN Patent Office office action in corresponding CN application No. 200910222699.5 dated Feb. 4, 2016 (13 pages).

CN Patent Office office action in corresponding CN application No. 200910222699.5 dated Dec. 26, 2012 (3 pages).

EP Patent Office office action in corresponding EP application No. 09252303.4 dated Oct. 6, 2010 (4 pages).

EP Patent Office office action in corresponding EP application No. 09252303.4 dated Mar. 22, 2013 (4 pages).

\* cited by examiner

JOINT ENHANCEMENT OF LIGHTNESS, COLOR AND CONTRAST OF IMAGES AND VIDEO

CROSS-REFERENCE TO RELATED APPLICATIONS

This application is a continuation of U.S. patent application Ser. No. 13/923,451, filed on Jun. 21, 2013, which is a continuation of U.S. patent application Ser. No. 12/286,317, filed on Sep. 30, 2008, which issued as U.S. Pat. No. 8,477,247 on Jul. 2, 2013.

BACKGROUND

This relates generally to processing video in a video processing pipeline.

A video processing pipeline is used to process video streams or still images from a video source, such as a television tuner, a set top box, or a media player such as an optical disk drive. A video processing pipeline may be used to improve received audio and video. The video processing pipeline may also enhance color and contrast of the received video.

DETAILED DESCRIPTION

Figure 1:
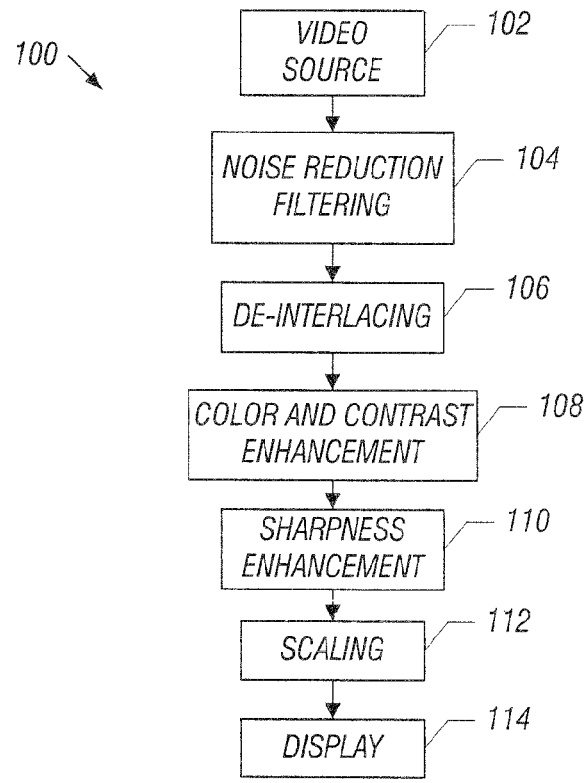
FIG. 1 is a depiction of a video processing pipeline in accordance with one embodiment.

Referring to FIG. 1, a video processing pipeline 100 may be used in a variety of applications, including a personal computer, a set top box, a television receiver, or a media player. The video source 102 may, for example, be a tuner, a DVD disk player, or a set top box, to mention a few examples. FIG. 1 shows typical components of a video pipeline, not necessarily proper sequencing, which depends on content, requirements, and the specific algorithms that are used.

The video source 102 provides interlaced video, in one embodiment, to a noise reduction and filtering unit 104. The block 104 performs noise reduction filtering on the digital signal provided from the video source 102. The de-interlacing module 106 converts interlaced video to progressive scan video in one embodiment.

The color and contrast enhancement 108 is responsible for enhancing both the color and the contrast. In some embodiments, the color and contrast enhancements may be done in "one shot," meaning that it is not necessary to adjust a first one of color or contrast and then to adjust the second one of color or contrast and then to go back and adjust the first one again to account for the changes in the second one. The position of color/contrast enhancement varies, and is known to interact with sharpness enhancement (perception of sharpness is affected by contrast).

A sharpness enhancement unit 110 may implement picture sharpness enhancement. A scaling unit 112 may resize the image for display on the display 114.

Figure 2:
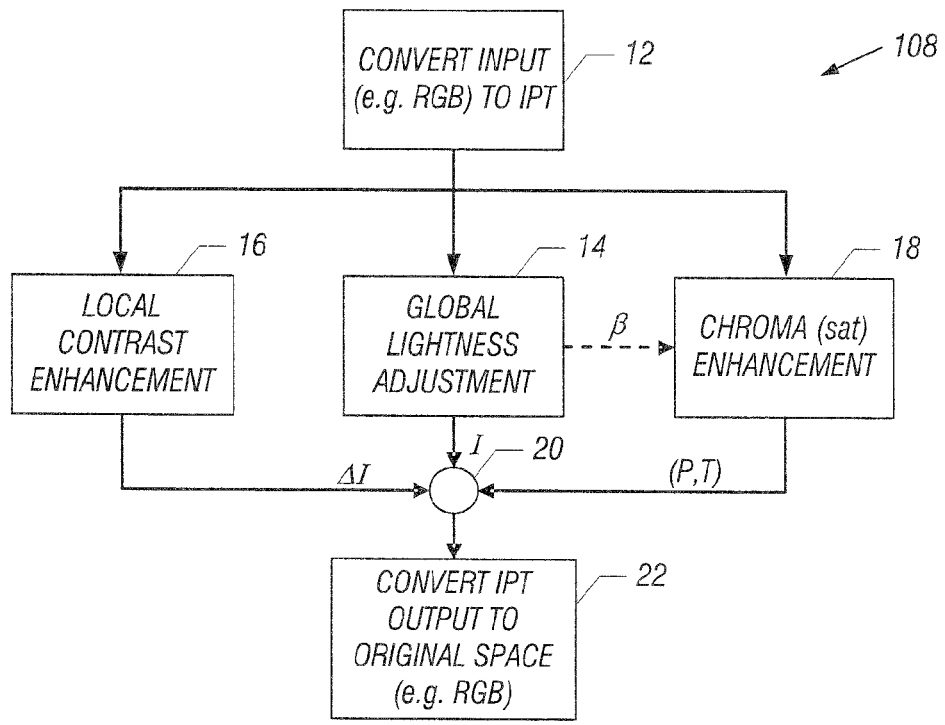
FIG. 2 is a schematic depiction of a color and contrast enhancement unit in accordance with one embodiment.

Referring to FIG. 2, the color and contrast enhancement unit 108 may enhance the color and contrast of received video in one shot. In one embodiment, the unit 108 may first convert to a suitable color space, as indicated in block 12. For video streams, the input color space is usually YCbCr, and for stills, RGB color space is common.

The color space to implement the color enhancement algorithm may be uniform in terms of perceived hue so that enhanced colors do not change in hues. In some embodiments, lightness prediction of chromatic colors does not have substantial hue or lightness modulation dependency. The color space may have invertible functional mapping between XYZ (or some other fundamental color description) and the color space dimensions. Also, the color space may be an opponent (has a neutral axis along one dimension) three-dimensional space.

Transformation to and from a linear color space may not be computationally expensive in some cases. One color space that is suitable is the IPT color space. "I" in IPT is loosely related to intensity, "P" is the red-green dimension, and the yellow-blue dimension is indicated by the letter "T." The IPT color space linearly models constant perceived hue.

The input image is unlikely to be in the IPT color space. Therefore, color space conversion may be necessary. Standard RGB (or sRGB) is converted to CIEXYZ for the 1931 2° standard observer with an illuminant of D65. Equation 1 shows the conversion from XYZ to IPT (sRGB is gamma corrected RGB; thus gamma correction is built-into this algorithm).

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix} \quad (1)$$

$$\begin{bmatrix} L \\ M \\ S \end{bmatrix} = \begin{bmatrix} 0.4002 & 0.7075 & -0.0807 \\ -0.2280 & 1.1500 & 0.0612 \\ 0 & 0 & 0.9184 \end{bmatrix} \begin{bmatrix} X_{D65} \\ Y_{D65} \\ Z_{D65} \end{bmatrix}$$

$$L' = L^{0.43}; L \geq 0$$
$$L' = -(-L)^{0.43}; L < 0$$
$$M' = M^{0.43}; M \geq 0$$
$$M' = -(-M)^{0.43}; M < 0$$
$$S' = S^{0.43}; S \geq 0$$
$$S' = -(-S)^{0.43}; S < 0$$

$$\begin{bmatrix} I \\ P \\ T \end{bmatrix} = \begin{bmatrix} 0.400 & 0.4000 & 0.2000 \\ 4.4550 & -4.8510 & 0.3960 \\ 0.8056 & 0.3572 & -1.1628 \end{bmatrix} \begin{bmatrix} L' \\ M' \\ S' \end{bmatrix}$$

If the input image is in YCbCr space, an additional step to convert to RGB may be used.

The color data in the IPT space, in accordance with one embodiment, may then be subjected to parallel local contrast enhancement, as indicated in block 16, global lightness adjustment or contrast enhancement, as indicated in block 14, and chroma or saturation enhancement, as indicated in block 18. The results of the parallel, one shot enhancements and adjustments may then be combined in 20; the enhanced value for I comes from the ΔI from local contrast enhancement, the new I after lightness correction, and the P and T components come from the chroma enhancement block. The resulting IPT output may then be converted back to its original color space, as indicated in block 22.

A color and contrast enhancement unit 108 may be both automatic and independent of image content or color in some embodiments. The unit 108 may also integrate color and contrast enhancement functionalities. The unit 108 may improve the overall saturation while maintaining the original hue in some embodiments. Advantageously, the unit 108 leaves the achromatic colors unaltered. The unit 108 advantageously does not increase the saturation of colors that are already saturated enough, and, thus, reduces perceived loss in sharpness and undesirable color enhancement. Also, the unit 108 may not produce out-of-gamut colors or color artifacts (e.g. blotchiness) in some embodiments. Finally, the unit 108 may be fast enough for the video processing chain operating at a regular frame rate in some embodiments.

The unit 108 may be implemented in software, hardware, or firmware. A software implementation may include computer executable instructions stored on a computer readable medium. A computer readable medium may be a semiconductor, magnetic, or optical storage.

In a typical image enhancement operation, increasing the saturation may lead to out-of-gamut or impermissible colors. As the saturation of a color increases, the lightness automatically goes down. Conversely, reducing the lightness gives a perception of increased saturation. Thus, in a typical image with normal exposure, the overall lightness may be reduced before increasing the saturation.

However, if an image is mostly dark to begin with, either due to under-saturation or due to high dynamic range of the image (which means a part of the image is quite bright at the same time), the lightness may be increased before any perceived color enhancement can be attained. In this case, saturation enhancement may be higher than the normal to counteract the effect of a perceived loss of saturation due to an increase in the lightness. Thus, a determination is made as to whether an image needs to be darkened or lightened, and to what extent. This may be achieved by the global lightness adjustment 14.

The global lightness adjustment 14 may be done using a lookup table (LUT). The pixel intensity curve is a straight line with unity slope below a lower threshold (for example, 0.1) and above upper threshold (for example, 0.9). Thus pixel intensities less than the lower threshold and more than the upper threshold are not altered in one embodiment. These thresholds are parameterized, and can be used as user controls.

Between these thresholds, the intensities are adjusted nonlinearly, for example, according to equation 2:

$$I_{OUT\text{-}GC} = I_i, I_i \leq I_{LowTH}$$

$$I_{OUT\text{-}GC} = I_i - \beta \sin(\pi^* I_i), I_{LowTH} \leq I_i \leq I_{HighTH}$$

$$I_{OUT\text{-}GC} = I_i, I_i \geq I_{HighTH} \quad (2)$$

where $I_i$ and $I_{OUT\text{-}GC}$ are the input and output intensities, and the beta parameter ($\beta$) determines the amount of adjustment and depends on the overall image characteristics as described below. A positive beta value darkens the image and a negative beta value lightens the image. The sine function is used to provide a unimodal, symmetric enhancement curve. Other similar mathematical functions can be used, and even sigmoid curves can be applied to implement functions equivalent to histogram equalization which could be built into the block. However, one objective of the lightness adjustment block is to provide the option to increase lightness in a way that synergistically makes saturation enhancement more effective (e.g. lightening a color gives more room for increased saturation, darkening a color improves colorfulness without much saturation enhancement).

The image intensity corresponding to a cumulative distribution function (CDF) of 0.5 is used to determine whether the image should be darkened or lightened in one embodiment. The 0.5 point of a CDF indicates the lightness below which 50% of the pixels are found. A cumulative distribution function plots the same intensity information normally depicted by histograms. However, the difference between a cumulative distribution function and a histogram is that the intensity values are summed from left to right in the cumulative distribution function. Typically, the cumulative distribution function displays relative frequency in terms of percentiles on the vertical axis and intensity or other units on the horizontal axis.

If the image intensity for the 0.5 CDF value lies below a pre-defined low CDF threshold (0.1, for example, meaning that 50% of the pixels are at or below 0.1% of the max lightness/intensity), the image may be lightened to the maximum level ($\beta = -0.15$, for example). If this intensity lies above a pre-defined high CDF threshold (0.9, for example), the image may be darkened to the maximum level ($\beta = 0.15$, for example). When the intensity lies in between, $\beta$ may be computed by linear interpolation. Once $\beta$ has been calculated, $\beta$ is used in the calculation of global lightness adjustment formula (2). $\beta$ is also used in the chroma enhancement block 18.

The calculation of $\beta$ involves computing empirical CDF, finding intensity I at CDF values of 0.2, 0.5, and 0.8 (L20, L50, L80), and applying the following computation method. If 50% of pixel intensity values (L50) lies below a low threshold (paramLowThresCDF50), then the image is lightened to the maximum and beta is set equal to paramBetaMax. Otherwise, if 50% of pixel intensities are greater than a high threshold (paramHighThresCDF50), then the image is darkened to the maximum and beta is set equal paramBetaMax. If % beta lies in between −betaMax and betaMax then beta is computed as a linear interpolation between −betaMax and betaMax {((2*abs(paramBetaMax)*(L50−paramLowThresCDF50))/(paramHighThresCDF50−paramLowThresCDF50))}−paramBetaMax.

Two additional conditions may be checked to ensure darkening or lightening does not cause some part of the image to be clipped. The first additional condition makes sure that no lightness correction is applied when beta is less than 0 and L80 is greater than or equal paramThresCDF80; i.e. if $\beta < 0$ && (L80 >= paramLowThresCDF80) then $\beta = 0$. The second condition makes sure that no lightness corrections is applied when beta is greater than 0 and L20 is less or equal than paramThresCDF20; i.e. if $\beta > 0$ && (L20 <= paramThresCDF20) then $\beta = 0$.

Typically, paramLowThresCDF50 is 0.1 with a typical range 0.1 to 0.3, paramBetaMax is 0.15 with a typical range 0.1 to 0.3, and paramHighThresCDF50 is 0.9 with a typical range 0.6 to 0.9. If top 20% pixel intensity in the CDF lies above paramThresCDF80 (which is 0.8), then the image should not be lightened. If beta is greater than 0 and L20 is less than or equal paramThresCDF20 (which is 0.2), i.e. if bottom 20% pixel intensity in the CDF lies below paramThresCDF20, then the image should not be darkened.

Figure 3:
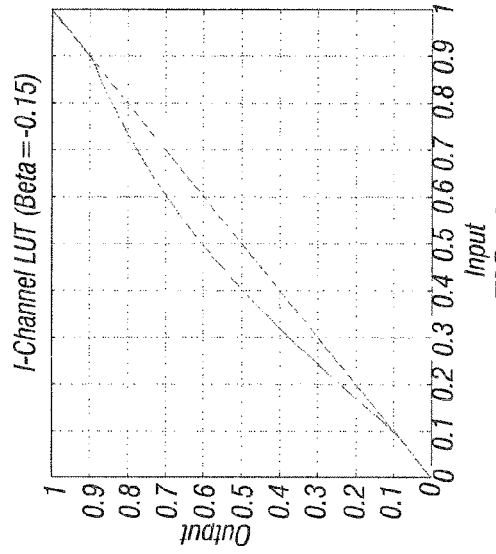
FIG. 3 is a cumulative distribution function graph for the image shown in FIG. 7.
Figure 4:
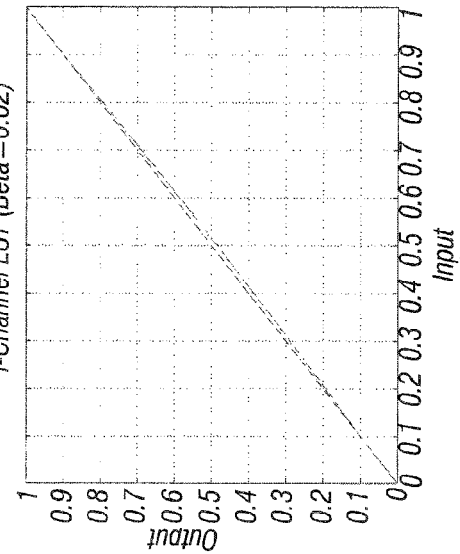
FIG. 4 is an intensity lookup table for the image shown in FIG. 7.

In FIG. 3, the CDF of an image that needs the maximum amount of lightening is depicted. For this image, the intensity corresponding to a CDF of 0.5 is only 0.107, which means 50% of the image pixels have intensities below 0.107. A plot for the intensity lookup table for β=−0.15 for that image is shown in FIG. 4.

Figure 5:
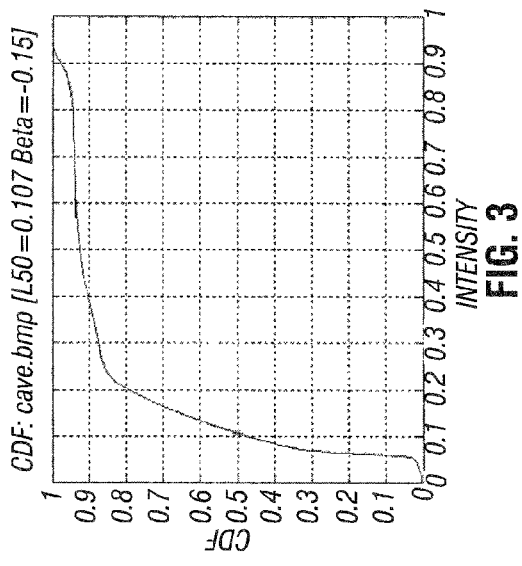
FIG. 5 is a cumulative distribution function graph for the image shown in FIG. 8.
Figure 6:
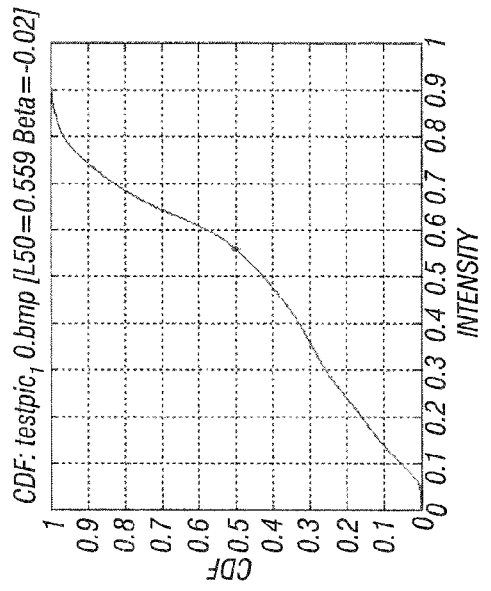
FIG. 6 is an intensity lookup table for the image shown in FIG. 8.
Figure 7:
FIG. 7 is a test image used in connection with FIGS. 3 and 4.
Figure 8:
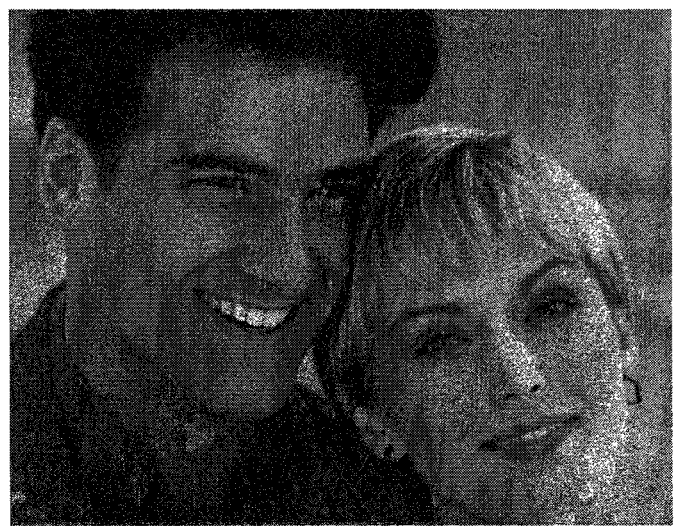
FIG. 8 is a test image used in connection with FIGS. 5 and 6.

In a properly exposed image, shown in FIG. 5, the intensity corresponding to a CDF of 0.5 is 0.56. By linear interpolation, the value of β was found to be 0.02. This leads to slight darkening of the image, as apparent from the intensity lookup table in FIG. 6.

The local contrast enhancement 16 is based on amplification of the difference between each pixel intensity and the local mean calculated on a properly selected region of support (e.g. 5×5 for standard definition images, the size and mean calculation can be made adaptive to size and resolution).

A 5×5 low-pass averaging filter may be used to get a filtered version of the original intensity image. An exponent is applied to the difference of the original and the filtered intensity data while preserving the sign (sgn) of the difference. The operation is depicted by equation 3, where $I_i$ is the input intensity and the parameter $\phi$ determines the amount of local enhancement:

$$I_{OUT-LC} = \text{sgn}(I_i - I_F) * |I_i - I_F|^{(1+\frac{\phi}{100})} \quad (3)$$

where $I_{OUT-LC}$ is the output intensity and $I_F$ is the low-pass filtered value. The operation preserves the sign of the difference, and $\phi$ is the local gain adjustable to ~15% maximum. Local gain $\phi$ can be also a function of the specific lightness or each pixel. One embodiment may use a fixed value and a clipping protection mechanism to avoid generating improper values of I, as was done for lightness adjustment, so values near the end of the range are not modified.

Finally, the output intensity resulting from global lightness adjustment and local contrast enhancement is obtained from summing the two effects in combiner 20 (FIG. 2), as shown in equation 4:

$$I_{OUT} = I_{OUT-GC} + I_{OUT-LC} \quad (4)$$

where $I_{OUT-LC}$ is a ΔI value added to the output of $I_{OUT-GC}$ (output of the global lightness adjustment).

Saturation enhancement 18 may be achieved by multiplying P and T by a saturation enhancement factor (for example, between 1.0 and 1.4). The saturation factor is applied to a range (for example, between 0.1 and 0.9) with a smooth rolloff at the ends so it will not produce banding artifacts (sudden saturation jumps).

If the chroma (saturation) of a pixel is below the minimum (min) threshold (achromatic) or above the maximum (max) threshold (already saturated), the saturation is left untouched. Otherwise, the saturation values are increased nonlinearly (using a lookup LUT similar to that of lightness adjustment). The saturation increase has a peak value of 20% (a maximum of up to 40% can be used for highly lightened images), with smooth roll-off at 0.1 and 0.9 saturation (so they stay unmodified and no illegal values will be generated)—implemented using a LUT as explained below. The maximum peak saturation of 40% is applied if the lightness gain beta is greater or equal to 0.75 of the max beta value paramBetaMax used in the global lightness adjustment (which is 0.15, as explained before). In IPT space, chroma is square root of $P^2+T^2$.

The output of the block 34 is the image which is saturation enhanced depending on the value of beta.

Figure 10:
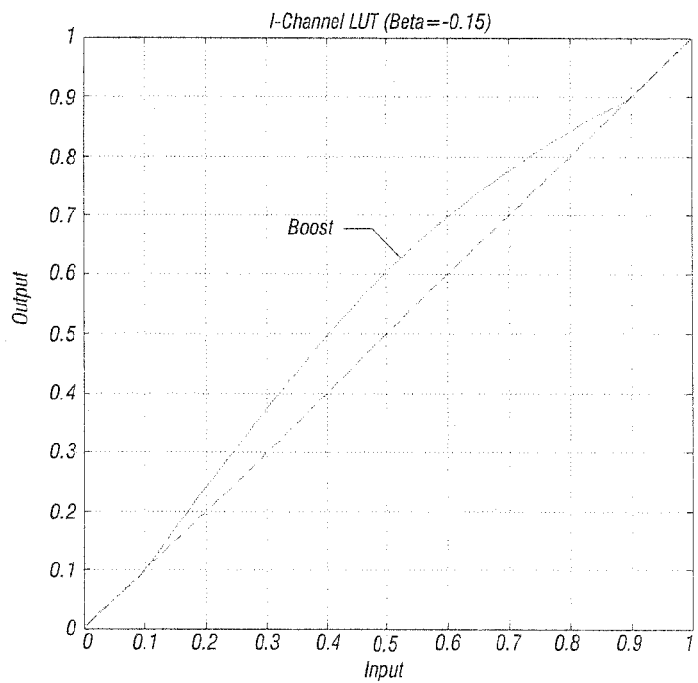
FIG. 10 is a graph of a saturation lookup table with a saturation boost of −0.15, according to one embodiment.

Depending on the value of beta, saturation uses a maximum boost, or moderate boost value: if ((m_Beta<0)&&(abs(m_Beta)>=0.75*m_BetaMax)) then compute LUT with maximum boost. Otherwise, compute LUT with normal boost. The saturation LUT implements a function of the form Boost*sin(π*$I_i$). A 100 point LUT may be used, in some embodiments, for which the bottom and top portions are linear, and set using two threshold values (e.g. 0.1 and 0.9). The curve for a boost of −0.15 is shown in FIG. 10.

Figure 9:
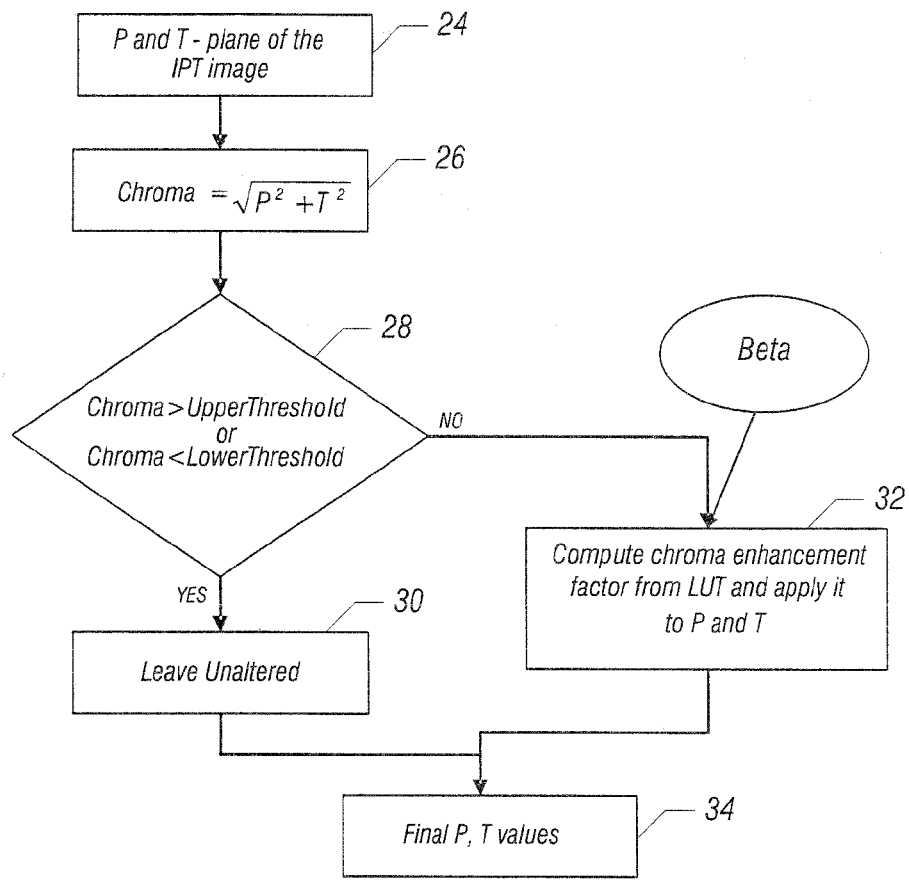
FIG. 9 is a flow chart for saturation enhancement according to one embodiment.

In FIG. 9, P and T planes of the IPT are received, as indicated in block 24. The chroma value is calculated as $\sqrt{P^2+T^2}$ (block 26), and the enhanced value is taken from the LUT. If the chroma is greater than an upper threshold or lower than a lower threshold (diamond 28), then the chroma is unchanged (block 30). Otherwise, the enhancement factor is the original chroma and the LUT value. Then, the new P and T values are computed using the enhancement factor to save an inverse computation of P and T from the enhanced chroma value, as indicated in block 32.

Similar to the global lightness adjustment, saturation enhancement may be achieved through a lookup table. The use of a lookup table avoids hard thresholds and the problems of artifacts associated with them. If the chroma of a pixel is below the low threshold (for example, 0.1), the color is likely to be achromatic and is left unaltered. Also, if the chroma of a pixel is above the high threshold (for example, 0.9), the color is already quite saturated and so is left unchanged. Colors in between these thresholds are increased in a nonlinear fashion, leading to a lookup table very similar to that shown in FIGS. 4 and 6.

If an image is significantly lightened, the perceived saturation reduces. Actual saturation enhancement in this case needs to be higher to counteract this effect. In one embodiment, an increase in the saturation was 20%, for significantly lightened images the increase was 40%. If the parameter β in equation 2 is negative, with the absolute value equal to or more than 75% of the maximum permissible β (e.g. 0.15), the image is assumed to be significantly lightened, and thus higher saturation enhancement factor may be used.

In some embodiments, an integrated approach for color and contrast enhancement can be achieved, in parallel, and in one shot.

The video processing techniques described herein may be implemented in various hardware architectures. For example, video processing functionality may be integrated within a chipset. Alternatively, a discrete video processor may be used. As still another embodiment, the video processing functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   accessing an image; and
   converting the image from the first color space to IPT color space;
   while in IPT color space,
      performing local contrast enhancement by amplifying a difference between each pixel intensity and a local mean calculated over a select region of pixels;
      performing global lightening adjustment by only altering pixel intensities above a lower intensity threshold and below an upper intensity threshold;
      performing a chroma enhancement only for pixels above a minimum saturation and below a maximum saturation threshold; and
   converting the image from IPT color space back to the first color space.

2. The method of claim 1, including performing combined control of brightness and gamma correction of the image by modifying the image, wherein modifying the image comprises converting the image from the first color space via a second color space to a third color space that linearly models perceived hue, modifying the image by altering a pixel's intensity non-linearly, said first, second and third color spaces being three different color spaces and performing color saturation control of the image while automatically compensating for brightness by modifying the image.

3. The method of claim 2, further comprising performing contrast control of the image while automatically compensating for saturation by modifying the image.

4. The method of claim 2, wherein the third color space that linearly models perceived hue comprises an intensity dimension, a red-green dimension, and a yellow-blue dimension.

5. The method of claim 2, wherein the third color space that linearly models perceived hue comprises an IPT color space.

6. The method of claim 2, further comprising performing global lightness adjustment of the image by modifying the image.

7. The method of claim 6, wherein performing global lightness adjustment includes altering only pixel intensities above a lower threshold and below an upper threshold.

8. The method of claim 7, wherein altering pixel intensities comprises using a lookup table.

9. At least one non-transitory machine-readable medium comprising a plurality of instructions that in response to being executed on a computing device, cause the computing device to:
   access an image; and
   converting the image from the first color space to IPT color space;
   while in IPT color space,
      performing local contrast enhancement by amplifying a difference between each pixel intensity and a local mean calculated over a select region of pixels;
      performing global lightening adjustment by only altering pixel intensities above a lower intensity threshold and below an upper intensity threshold;
      performing a chroma enhancement only for pixels above a minimum saturation and below a maximum saturation threshold; and
   converting the image from IPT color space back to the first color space.

10. The at least one machine-readable medium of claim 9, that in response to being executed on the computing device, cause the computing device to perform combined control of brightness and gamma correction of the image by modifying the image, wherein modifying the image comprises converting the image from the first color space via a second color space to a third color space that linearly models perceived hue, modifying the image by altering a pixel's intensity non-linearly, said first, second and third color spaces being three different color spaces, and perform color saturation control of the image while automatically compensating for brightness by modifying the image.

11. The at least one machine-readable medium of claim 10, further comprising instructions that in response to being executed on the computing device, cause the computing device to perform contrast control of the image while automatically compensating for saturation by modifying the image.

12. The at least one machine-readable medium of claim 10, wherein the third color space that linearly models perceived hue comprises an intensity dimension, a red-green dimension, and a yellow-blue dimension.

13. The at least one machine-readable medium of claim 10, wherein the third color space that linearly models perceived hue comprises an IPT color space.

14. The at least one machine-readable medium of claim 10, further comprising instructions that in response to being executed on the computing device, cause the computing device to perform global lightness adjustment of the image by modifying the image.

15. The at least one machine readable medium of claim 10, further comprising instructions cause the computing device to perform global lightness adjustment by altering only pixel intensities above a lower threshold and below an upper threshold and to alter said pixel intensities non-linearly.

16. An apparatus, comprising:
   circuitry to convert the image from the first color space to IPT color space, while in IPT color space, perform local contrast enhancement by amplifying a difference between each pixel intensity and a local mean calculated over a select region of pixels, perform global lightening adjustment by only altering pixel intensities above a lower intensity threshold and below an upper intensity threshold, perform a chroma enhancement only for pixels above a minimum saturation and below a maximum saturation threshold, and convert the image from IPT color space back to the first color space.

17. The apparatus of claim 16, while in IPT color space, perform local contrast enhancement by amplifying a difference between each pixel intensity and a local mean calculated over a select region of pixels, perform global lightening adjustment by only altering pixel intensities above a lower intensity threshold and below an upper intensity threshold, perform a chroma enhancement only for pixels above a minimum saturation and below a maximum saturation threshold, and convert the image from IPT color space back to the first color space wherein the third color space that linearly models perceived hue comprises an intensity dimension, a red-green dimension, and a yellow-blue dimension.

18. The apparatus of claim 16, wherein the third color space that linearly models perceived hue comprises an IPT color space.

19. The apparatus of claim 16, wherein the circuitry is to further perform color saturation control of the image while automatically compensating for brightness and contrast based on the converted image.

20. The apparatus of claim 16, wherein the circuitry is to further perform contrast control of the image while automatically compensating for saturation based on the converted image.

21. The apparatus of claim 16, wherein said circuitry to perform global lightness adjustment by non-linearly altering only pixel intensities above a lower threshold and below an upper threshold.

* * * * *